March 5, 1957 KUN LI CHIEN 2,784,390

STATIC MAGNETIC MEMORY

Filed Nov. 27, 1953 2 Sheets-Sheet 1

INVENTOR.
Kun Li Chien
BY Morris A. Rabkin
ATTORNEY

March 5, 1957 KUN LI CHIEN 2,784,390

STATIC MAGNETIC MEMORY

Filed Nov. 27, 1953 2 Sheets-Sheet 2

INVENTOR.
Kun Li Chien
BY Morris A. Rabkin
ATTORNEY

United States Patent Office 2,784,390
Patented Mar. 5, 1957

2,784,390

STATIC MAGNETIC MEMORY

Kun Li Chien, Haddonfield, N. J., assignor to Radio Corporation of America, a corporation of Delaware Application November 27, 1953, Serial No. 394,785
13 Claims. (Cl. 340—174)

Figure 1:
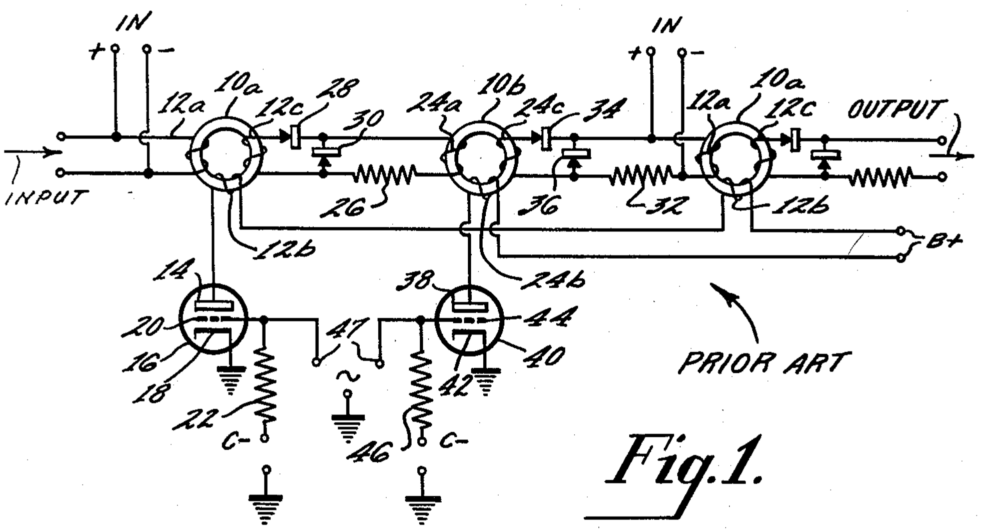

The present invention is related to memories, and particularly to a static magnetic memory.

Several forms of static magnetic memories are known. The present invention is related to a type of static magnetic memory which may be employed as a register. Registers often provide for parallel input, that is, the digits of a number to be entered in the register may be entered or applied, if desired, simultaneously, in the place of proper rank without reference to the order of the digit in the number. The number may now be sequentially read out by withdrawing the number digit by digit, each in its proper order in the number. Usually, the least significant digit is read out first. Often, shift registers are employed for sequential read-out.

The driving force applied to a shift register to step along the number entered therein usually depends upon the number entered in the register. Thus a variation of the load upon the driving force results. The driving force is usually supplied by one or more vacuum tubes. Accordingly, such registers present a variable load circuit to the driving tube. Such variability is undesirable for most efficient operation of a vacuum tube circuit. Again, in such registers, it is usual to step the number along the register using alternate temporary storage cores, so that two cores are required for every bit (presence or absence) of information. Thus, for example, to store a binary number of $n$ digits, $2n$ magnetic cores are required. If another number of $n$ digits is to be stored, a second set of $2n$ cores is required, etc. Where two numbers each of $n$ digits are to be stored and the numbers are to be shifted in the registers simultaneously, it is difficult accurately to maintain the shifting in synchronism. Also, a full cycle of alternate pulses is required to shift the numbers to the adjacent position of registry. Faster operation of sequential read-out is sometimes desirable.

It is an object of the present invention to provide a novel magnetic core sequential read-out register.

It is another object of the invention to provide a static magnetic memory sequential read-out register.

It is another object of the invention to provide a static magnetic memory sequential read-out register which presents a substantially uniform load to a driving circuit, and particularly to a vacuum tube driving circuit.

A further object of the invention is to provide a static magnetic register such that simultaneous sequential read-out of the digits stored in two or more such registers may be secured.

A further object of the invention is to provide an improved static magnetic memory from which to read-out sequentially the digits of numbers stored in two or more shift registers simultaneously with greater simultaneity than is presently available, and without substantial circuit complication.

A further object of the invention is to reduce the time for reading-out sequentially the digits of a number stored in a register by reading out one digit for each half cycle of driving pulses.

A further object of the invention is to eliminate temporary storage in a magnetic shift register, and thus increase the read-out rate.

A further object of the invention is to provide a novel static magnetic memory for parallel input and sequential output.

In accordance with the invention, a first set of cores, which may be termed the driving or sequencing cores, are provided. The sequencing cores are successively, one after the other, turned over from one magnetic state to another, thereby to provide successive driving impulses. A second set of cores is provided which may be termed the storage cores. Each storage coil is connected in series by a coil linkage between successive pairs of driving cores. The output from the storage cores may be taken from a single coil coupled to all of the storage cores. Accordingly, as the single driving impulse is passed along the sequencing cores, as will appear more fully hereinafter, the driving pulse sequentially drives the storage cores into "zero" state. As each storage core is driven to "zero," any storage core which was in the binary "one" state, by reason of the previously stored information, is turned over. The turn-over of a storage core applies an output pulse to the output line or coil. The driving pulse is shifted along the driving or sequencing line by a pair of alternately pulsed tubes. Each tube is connected to a different alternate set of the sequencing cores. Thus, the maximum read-out rate may be substantially doubled over that of the prior art shift register. No temporary storage between read-out is required. In order to provide parallel inputs, each storage core is wound with an input coil.

Figure 2:
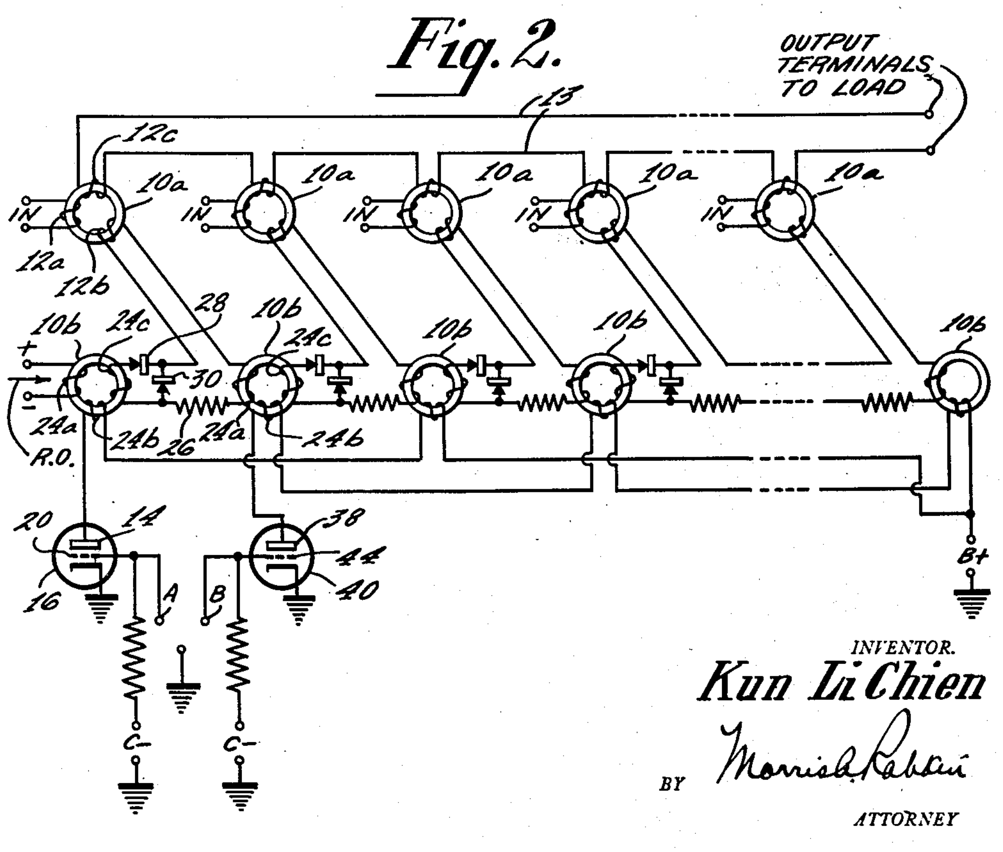
Figures 3, 4:
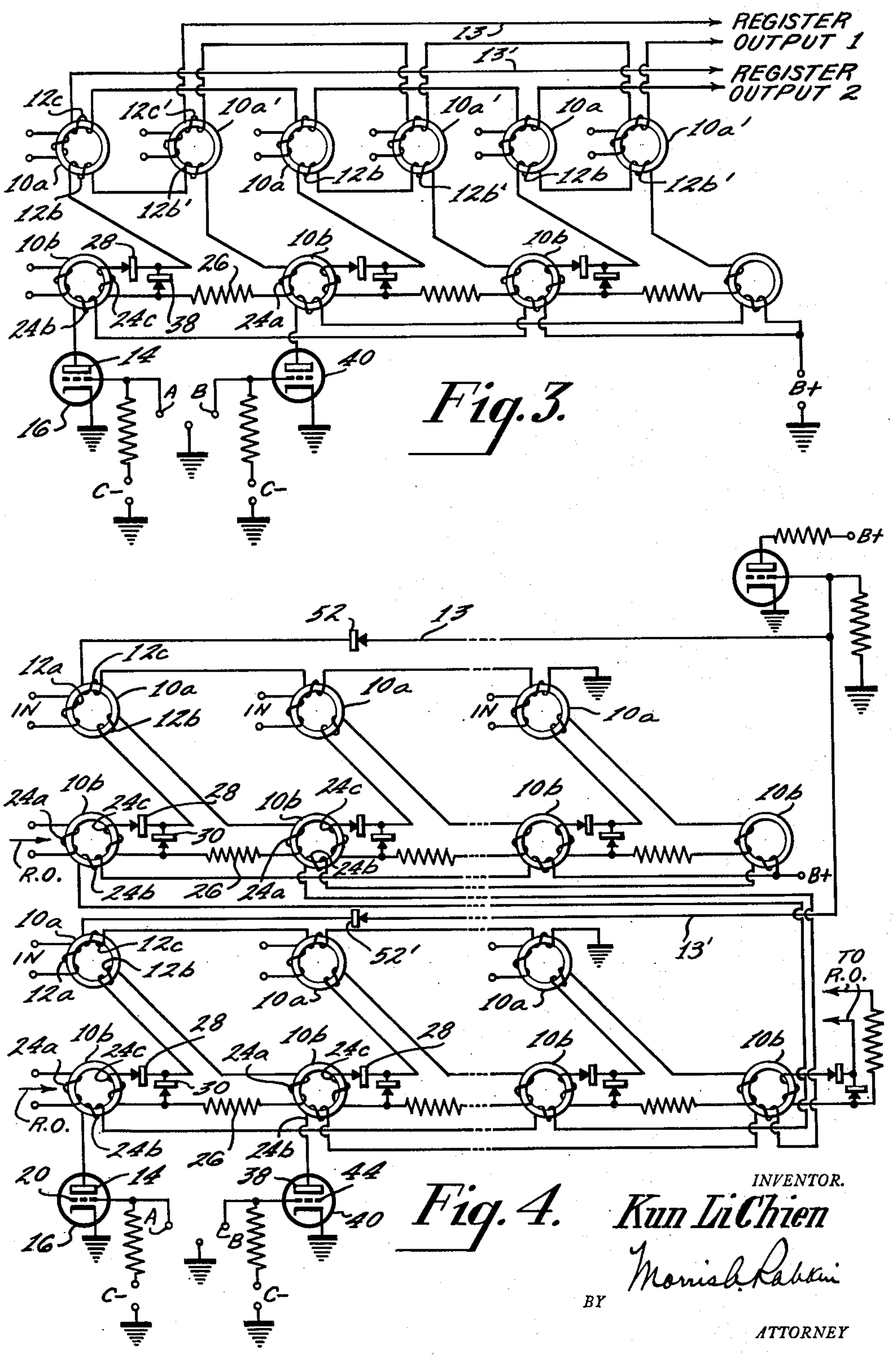

The foregoing and other objects, advantages, and novel features of the invention will be more fully apparent from the following description, in which like reference numerals refer to similar parts, and in which Figure 1 is a diagram schematically portraying a prior art shift register;

Figure 2 is a circuit diagram schematically portraying a register according to the invention having one set of storage cores for the storage of a multi-digit binary number;

Figure 3 is a circuit diagram schematically showing another embodiment of the invention having two sets of storage cores, each set capable of storing a different multi-digit binary number, and in which the numbers stored in each set of storage registers are simultaneously read out by a single set of sequencing cores; and Figure 4 is a circuit diagram schematically showing a single storage with a number of digits greater than those which may be advantageously stored in the arrangement of Fig. 2.

Referring to Fig. 1, in one prior art arrangement, primary storage cores **10*a* are alternated with temporary storage cores 10*b*. Each of the cores 10*a* has an input winding 12*a*, a drive winding 12*b*, and an output winding 12*c*. All the drive windings 12*b* are connected in series with each other between the anode 14 of a vacuum tube 16 and the positive terminal of a source of voltage indicated as B+. The cathode 18 of the drive tube 16 and the negative terminal of the B+ supply (not shown) are connected to a common conductor conventionally indicated as ground. Each of the temporary storage cores 10*b* has three windings, an input winding 24*a*, a drive winding 24*b*, and an output winding 24*c*. Each output winding 12*c* of the primary storage cores 10*a* is connected in series with the temporary storage core input winding 24*a* and with a resistor 26 and a rectifying element 28** which may be a crystal diode. A second or shunt rectifying element which also may be a crystal diode 30 is connected in shunt across the leads between the primary storage or output winding 12*c* and the input winding 24*a* but with the diode 28 between the primary storage core output winding 12*c* and the shunt diode 30, and with the resistor 26 between the temporary storage core input winding 24*a* and the shunt diode 30.

Similarly, between each temporary storage output coil 24*c* and each primary storage input coil 12*a*, the output coil 24*c* is connected as a source in series with a rectifying element or diode 34 and a resistor 32, and a shunt diode 36 is connected between the leads between the output windings 24*c* and input winding 12*a*. Also, in similar manner, the series diode 34 is between the output winding 24*c* and the shunt diode 36 connection, and the resistor 32 is between the input winding 12*a* and the shunt diode 36.

All the driving windings 24*b* of the temporary storage cores 10*b* are connected in series with each other between an anode 38 of a vacuum tube 40 and the positive terminal of the B+ supply. The cathode 42 of the tube 40 is connected to ground. The grid 44 of the tube 40 and the grid 20 of tube 16 may be connected to the opposite terminals of a balanced A. C. source, or to a source of positive pulses alternately applied first to the one grid and then to the other. The grids 20, 44 have grid resistors 22, 46, respectively, through which a grid bias voltage, conventionally indicated *c*—, is applied to the grids. The grid bias voltage is sufficient to cut off the tubes 16, 40. Thus the tubes 16, 40 are normally cut off except when the bias is overcome on positive voltage swings of the voltage applied to the terminals 47. Each input winding 12*a* of the primary storage cores 10*a* is provided with appropriate input terminals for the entry of a suitable binary digit by the flow of current between the input terminals.

The operation of the arrangement of Fig. 1 is well understood by those skilled in the art. The application of every complete cycle of voltage to the driver tubes 16, 40 advances a unit stored in any primary storage core 10*a* to the succeeding primary storage core 10*a*. If, however, a zero is stored in any primary storage core 10*a*, the succeeding primary storage core 10*a* is brought to or remains in the zero state by reason of the drive current through the drive coil 24*c* on the next cycle of voltage applied to the driver tubes 16, 40. The series diode 28 between each primary core 10*a* and succeeding temporary core 10*b* interposes a high series impedance to the flow of reverse current. At the same time, the shunt diode 30 offers a low shunt resistance, enhanced by the series diode 28 resistance and the series resistance of resistor 26. Therefore, neither the primary storage cores 10*a*, nor the temporary storage cores 10*b* can feed pulses or storage units in a reverse direction by reason of the series diodes 28, and resistors 26, and the shunt diodes 30. The series diode 34 between any temporary storage core 10*b* and the succeeding primary storage core 10*a*, and any series resistor 32 and the shunt diode 36 also between any temporary storage core 10*b* and permanent storage core 10*a*, act in a similar manner to prevent the reverse movement of the stored pulses.

Accordingly, the arrangement of Fig. 1 acts as a shift register. Any number stored in the register is shifted to the right. The last unit digit on the left is shifted successively, once with each cycle of storage pulses, to the right, and replaced by storage of a zero in the permanent storage core 10*a* from which it was taken. The output may be taken from the last temporary storage core 10*b* and is usually taken directly from the last output coil 24*c*.

Referring to Fig. 2, a memory according to the invention may include primary storage cores 10*a* and a set of driving or sequencing cores 10*b*. The sequencing cores 10*b*, however, do not function as temporary storage cores. The arrangement according to the invention does not require the temporary storage of the digits stored in the permanent storage cores. The drive windings 12*b* of the primary storage cores 10*a* are not connected in the anode circuit of the vacuum tubes 16 and 40 directly. Instead, every other one of the sequencing cores 10*b* is connected in series between the anode 14 of the vacuum tube 16 and the positive terminal of the B+ supply. The remaining ones of the sequencing cores 10*b* are connected in series between the anode 38 of the vacuum tube 40 and the B+ supply. The drive windings 12*b* of the primary storage cores 10*a* are connected between the output and input windings 24*c* and 24*a*, respectively, of the successive pairs of the ordered sequencing cores 10*b*, the first being paired with the second, the second with the third, etc. Between any two cores, each series diode 28 and shunt diode 30 are connected following each output winding 24*c* of the preceding core and ahead of the serially connected drive winding 12*b* and input winding 24*a* of the succeeding core. A different resistor 26 is inserted between each different output winding 24*c* and the windings 12*b* and 24*a* serially connected to the winding 24*c*. It is apparent that the diodes 28 and 30 and that resistor 26 serve to prevent voltages from the drive winding 12*b* and the sequencing input winding 24*a* from being fed back to the sequencing output winding 24*c* in serial connection therewith. All of the output windings 12*c* of the primary storage cores are connected in series with each other, and may be considered as a single coil 13.

In operation, as viewed in Fig. 2, the various drive cores 10*b* are saturated to a zero state when saturated with flux in a clockwise direction. Saturation in a counterclockwise direction conforms to "unit" storage. Saturation of the primary cores 10*a* with flux in a counterclockwise direction as viewed in Fig. 2 is taken as storage of a "one." Let a binary number of *n* digits be stored in the primary storage cores 10*a* by impressing a saturating current on input windings 12*a*. Assume that such a current impressed with the upper terminal of any selected pair of input terminals to the input winding 12*a* positive corresponds to storage of a binary "one" and with this upper terminal negative corresponds to storage of a binary zero. In order to read out the digits of the number stored in the primary storage cores 10*a* in sequence, a read-out pulse or binary "one" is inserted at the terminals indicated RO of the first drive or sequencing core 10*b* input winding 24*a*. The upper terminal is made positive in order to pass a saturating current through the input winding 24*a* of the sequencing core 10*b*. Afterward, the unit pulse at terminals RO may be removed. After the read-out pulse is applied, as soon as the normally non-conductive tube 16 is made conductive by the first half cycle of alternating pulses applied to terminal A and the grid 20 of the first tube 16, the first sequencing core 10*b* is turned over by the saturating current in the zero direction from the tube 16 passed through the first sequencing core drive winding 24*b*. When the first sequencing core 10*b* turns over, the change of flux in this first sequencing core induces a voltage in the first sequencing output winding 24*c*. Therefore, the first sequencing core output winding 24*c* may be considered as a source, to which the first primary core drive winding 12*b* and the second sequencing core 10*b* input winding 24*a* are connected in series. The voltage induced in the first sequencing core 10*b* output winding 24*c* then drives a saturating current through the drive winding 12*b* of the first primary storage core 10*a* and also through the input winding 24*a* of the second sequencing core 10*b*. The current through each of the latter windings is sufficient to saturate the cores of the respective windings. The sense of saturation is in the zero sense for the linked primary storage core 10*a*, but in the "one" sense in the next succeeding sequencing core 10*b*.

The first (on the left, in Fig. 2) primary storage core 10a, if already in the zero state, remains unchanged. No flux is induced in the first primary storage core output winding 12c, However, if a "one" was previously stored in the first primary storage core 10a, this first core is turned over. The change of flux induces an output voltage in the first primary storage core output winding 12c. This output voltage appears across a suitable load connected across the output terminals and may be sensed in a suitable manner. Preferably the load is high impedance, so that the flow of current does not affect the other cores coupled to output winding 12c.

It is apparent that the binary digit stored in the first primary storage core 10a on the left of Fig. 1 has now been read out. At this point, the first permanent storage core 10a is cleared or in the zero state. The read-out pulse applied to the first sequencing core has advanced to the second sequencing core.

During the next half cycle of the timing pulses applied to terminals A and B, the terminal B and the second tube grid 44 is made positive and the tube 40 becomes conductive.

The second sequencing core 10b is now driven to the zero state by the drive winding 24b. An output voltage is induced in the output winding 24c of the second sequencing core 10b. This last named output voltage causes a saturating current to pass through the sequencing core 12b of the second permanent storage core 10a and also through the input winding of the third sequencing core 10b. The saturating current through the drive winding of the second primary storage core 10a is in a direction to drive the second primary storage core 10a to the zero state, if it is not already in the zero state. The current through the third sequencing core 10b input winding 24a is in a direction to store a sequencing or drive "unit" or "one" in that third core. If a "one" was previously stored in the second primary storage core 10a, this second primary storage core 10a turns over and induces a voltage in its output winding 12c which, as before, appears at the output terminals to the load. No output goes to the load if no binary one was stored in the second primary storage core 10a. At this point, the second primary storage core 10a has been returned to, or remains in, the zero state, so that both the first and second primary storage cores 10a are in the zero state. At this time, the first two binary digits (starting from the left of the permanent storage cores is viewed in Figure 2) have been read out in sequence.

On the next half cycle of the timing pulses, tube 16 again becomes conductive. The sequencing "one" advances from the third to the fourth sequencing core while the third binary digit (from the left as viewed in Fig. 2) of the number stored in the third primary storage core 10a is read out, and so on. It is now apparent that although the binary digits of the stored number are read out in sequence, the register of Fig. 2 is not a shift register in the sense that "shift register" implies that the entire number is shifted along. The read-out sequence is in order from one of the ordered primary storage cores to the next. As each digit is read out, the core in which it was stored is cleared. As each digit is read out in succession, the storage core for that digit is restored to its original "zero" condition. Thus the register of Fig. 2 together with the sequencing cores may be considered as a sequential read-out register. As each digit of the binary number stored in the permanent storage register is taken out or read, the storage for that digit is cleared. All of the digits are read out in sequence.

The read-out current for any stored "one" passes through the single read-out coil 13 formed by the serial connection of all the output windings 12c and therefore passes through all of the windings 12c. Such read-out current might saturate the other primary cores 10a all in one sense, the "one" sense as shown in Fig. 2. Therefore, it would at first appear that the register would not operate properly. However, an output load is employed which senses the voltage induced in the output coil, but has a high impedance. The output impedance is sufficiently high that current in saturating amount does not pass through the output coil. The output load may be, for example, the grid circuit (grid resistor and grid) of a suitable vacuum tube amplifier.

The output is thus applied to a device which is voltage sensitive in preference to current sensitive. To enhance the voltage output, the turns of the output winding 12c are made greater than the turns of the input winding 12b. Thus a voltage step-up is obtained. At the same time there is a current step-down so that the output coil is even less likely to cause undesired turnover and storage destruction by the output.

In one successful embodiment using a vacuum tube grid circuit at the output, the drive winding 12b had 40 turns, and the output winding 12c had 150 turns. There were 16 primary storage cores 10a for the storage of a 16-digit binary number. If many more than 16 digits of a number are to be stored, various means may be employed, for example, as illustrated in Fig. 4 and described hereinafter, for avoiding storage destruction.

It will be observed that, if desired, the last sequencing core 10b on the right as viewed in Fig. 2, and its input coil 24a may be omitted. The last winding 24a may be replaced by a short-circuit. Accordingly, it is apparent that as many sequencing cores may be employed as primary storage cores. Thus, for the storage of a binary number of $n$ digits, $2n$ cores are used in the prior art embodiment illustrated in Fig. 1. However, the stored number is completely read out in approximately $n$ cycles of the positive pulses applied to terminals A, B as distinguished from twice that many pulses required in the arrangement of Fig. 1.

In the arrangement of Fig. 1, with the employment of the shift register having temporary storage cores, a pulse through one drive coil coupled to the primary storage cores transfers the pulses to the temporary storage cores, at the same time feeding out the last digit, and then a second pulse is required in the next drive coil to advance the remainder of the digits in temporary storage to their new primary storage place. In the embodiment of Fig. 2, on the other hand, one digit of the stored binary number is read out with a pulse applied to each of the drive coils. It is not necessary to employ a time period for transfer to temporary storage and retransfer to storage cores. Instead, each digit is read out from a primary storage core and that primary storage core is cleared at the same time. With each advance of the read-out pulse along the sequencing or drive cores, a binary digit is read out and the primary storage core in which the binary digit was stored is cleared. Thus, faster action of the read-out is available.

Referring to Fig. 3, the set of primary storage cores 10a is arranged to receive one binary number, and the primary storage cores 10a' are arranged to receive a second binary number. It may be assumed that the two binary numbers have the same number of digits. Accordingly, the cores 10a and 10a' are the same in number. Parts for the storage and read-out of the second binary digit have reference numerals like those applied to similar parts for the storage and read-out of the first binary number except with a prime. The arrangement of Fig. 3 differs from that of Fig. 2 in the interposition of the drive windings 12b' of the primary storage cores 10a'. Each of the drive windings 12b' is inserted in the coil including in its serial connection the corresponding drive windings 12b of one of the first set of primary cores 10a and one of the input windings 24a of the sequencing cores 10b. The drive winding 12b' of only one of the further set of primary storage cores 10a' is thus placed in the series connection of each drive winding 12b of the primary storage cores 10a and a sequencing core 10b input winding 24a. The diodes 28 and 30 and the resistor 26 are connected in the circuit as before to prevent reverse voltage from being fed back in the wrong direction along the sequencing core windings. Note that each output winding 24c and input winding 24a and the primary storage core drive windings 12b and 12b' connected together may be considered as a single coil. Each such coil links a consecutive pair of sequencing cores 50 and the first primary storage cores 10a and 10a' are coupled to the first sequencing core 10b of that pair. The serially connected output windings 12c of the primary storage cores 10a may be considered as connected in a single coil 13 linking all of the primary storage cores 10a. The primary storage cores 10a' may be considered as linked by a single output coil 13' formed by the serial connection of all of the output windings 12c'.

In the operation of the arrangement of Fig. 3, as each sequencing pulse is applied to the input windings 24a of each sequencing core 10b, that sequencing core turns over, and an output voltage is generated at the output winding 24c of that sequencing core 10b. This output voltage at the sequencing core output winding 24c causes current to flow in the coil comprising the winding 24c, the drive windings 12b and 12b' of the associated primary storage cores 10a and 10a' and the input winding 24a of the succeeding sequencing core 10b. If a binary "one" is stored in either of the primary storage cores 10a or 10a', it is read out of the register output 1 or the corresponding register output 2 respectively, because of the currents induced in the output coils 13 and 13' respectively associated with the first set of cores 10a or the second set of cores 10a'.

In the embodiment of Fig. 3, therefore, each of the primary storage cores 10a or 10a' actuated by a sequencing pulse passing from one sequencing core 10b to the succeeding one, if not already in zero state, is driven to zero state. The output pulse from each binary digit of the same rank in the two binary numbers stored in the two primary storage cores 10a or 10a' are therefore read out simultaneously. The simultaneity is greater than that which may be achieved by ordinary methods. It is apparent that more than two registers may be employed, each register storing an $n$ digit binary number and with only one set of $n$ sequencing cores.

In Figures 2 and 3, as the sequencing coils are driven in succession by the tubes 16 and 40, the impedance presented to each coil remains roughly the same. Each coil as it passes a current pulse causes only one sequencing core to turn over, and not more than one. As one, and only one, sequencing core is turned over with the passage of each current pulse through the sequencing coils, the same or substantially the same impedance is always presented to the vacuum tube circuit of tubes 16 and 40.

In practice, due probably to noise generated in the primary cores 10a and coupled to the output coil, it has been found that the number of primary cores 10a or 10a' linked by a single winding is limited. However, the capacity of the register need not be limited for that reason. As illustrated in Fig. 4, two output coils 13 and 13' of registers like that of Fig. 2 may be connected in parallel in a logical "or" circuit including, for example, two diodes 52 and 52' in series, respectively, with each output coil 13 and 13'. The "or" circuit output may be applied to the grid of a tube (see at upper right of Fig. 4) as means for coupling to a utilization circuit, which may be coupled to the tube anode, for example. Each output coil 13 and 13' may be coupled to less than the limiting number of primary cores; for example, each may couple respectively to 16 primary cores. The sequencing pulse for the second set of sequencing cores is introduced, however, from the output winding 24c of the last sequencing core of one register, by the connection as shown, to the input terminals RO of the next.

In operation, the sequencing pulse passes through the first group of sequencing cores 10b and from the last of these to the second group of sequencing cores 10b'. It is apparent, from what has been said above and from Fig. 4, that two or more component registers like Fig. 2 may thus be employed as a single register. This single register of Fig. 4 affords sequential read-out of a single number having a number of digits equal to the total number of primary storage cores of all the component registers. If desired, only a single pair of driving tubes 14, 16 may be employed. Then the coil including every other sequencing core input winding 24b may be connected in one tube cathode-anode circuit and that including the remaining sequencing core input windings may be connected in the other tube 16 cathode-anode circuit, as shown. In any of the registers shown in Figs. 2–4, suitable circuitry may be used to provide parallel read-in or storage.

Thus, the invention discloses an especially convenient, useful, and economical arrangement for a sequential read-out register. More than one such register may be used according to the invention with one arrangement of sequencing cores to drive the several registers simultaneously. The arrangement according to the invention provides a sequential read-out for binary digits which may be placed in storage in parallel. The read-out arrangement according to the invention is especially rapid in operation and maintains synchronism of the read-out of two or more sequential read-out registers where required. Provision may be made for the parallel storage and sequential read-out of a binary number of a very large number of digits with simple circuitry.

What is claimed is:

1. In a sequential read-out register, the combination comprising a first set of primary magnetic cores; a second set of magnetic cores paired in order, the first with the second, the second with the third, etc.; an output coil linking a plurality of said first set cores; and a plurality of coils one individual to and linking each said pair with a different core of said primary cores.

2. In the register as claimed in claim 1, the combination comprising a further set of primary magnetic cores, each of said individual coils linking a different core of said further set.

3. In a sequential read-out register, the combination comprising a first set of primary storage magnetic cores; a second set of magnetic cores paired in order, the first with the second, the second with the third, etc., a plurality of coils, one linking each core of said first set respectively with a different pair of said second set of cores, means including said coils to shift a binary one successively from each core of said second set to the succeeding paired core of said second set, a read-out coil linking all said first set cores, and means individually to apply a current for storage of a binary one to selected ones of said first set of cores.

4. A sequential read-out register comprising a first plurality of magnetic cores; a second plurality of magnetic cores; a plurality of means one individual to each of said first plurality of cores to store a binary one or a binary zero in each said core; an output coil linking all said first plurality of cores; first and second driving coils one linking alternate ones of said second plurality of cores and the other linking the remaining cores of said second plurality; and coil couplings one between each of said second plurality of cores, the next succeeding one of said second plurality, and an individual different one of said first plurality.

5. The register as claimed in claim 1, each said individual coil being linked to three and only three magnetic cores.

6. A sequential read-out register comprising a first set of ordered magnetic cores; a second set of magnetic cores paired in order, the first with the second, the second with the third, etc.; each said core having an input winding, an output winding, and a drive winding; coils each comprising, serially connected, the output winding of the first core of each pair of specified order, the input winding of the succeeding core of said pair, and the drive winding of the first set core of the same specified order; the said first set core output windings being connected together in series; a first drive coil comprising alternate second set core drive windings connected serially; and a second drive coil comprising the other alternate second set core drive windings connected serially.

7. The read-out register claimed in claim 6, further comprising rectifying elements, a different one serially connected in each of said first-mentioned coils.

8. The read-out register claimed in claim 6, further comprising rectifying elements, a different one shunt connected across each of said first-mentioned coils.

9. The read-out register claimed in claim 6, further comprising resistors, a different one serially connected in each of said first-mentioned coils.

10. The read-out register claimed in claim 6, further comprising a plurality of means, a different means in circuit with each said first-mentioned coil, to prevent the reverse feed of binary ones from a second to a first core of each pair of said second set of cores.

11. The read-out register claimed in claim 6, further comprising a pair of tubes, one of said tubes being connected in series with said first drive coil and the other of said tubes being connected in series with said second drive coil, and means to apply voltage from a source to said tubes respectively through said coils, whereby each tube may be employed to control the current through the coil with which it is respectively connected.

12. In a sequential read-out register, a second combination like that claimed in claim 1, the second combination read-out coil and said first combination read-out coil being connected by a logical "or" circuit to apply output to a utilization circuit, and means to advance said binary one from the last core of said second set of said first combination to the second combination first core of said second set.

13. A sequential read-out register comprising a plurality of cores, two read-out coils each coupled to a different plurality of cores of said first-mentioned plurality, means for coupling to a utilization circuit, and a logical "or" circuit coupling said read-out coils to said means.

References Cited in the file of this patent

UNITED STATES PATENTS

| | | |
|---|---|---|
| 2,654,080 | Browne | Sept. 29, 1953 |
| 2,678,965 | Ziffer | May 18, 1954 |
| 2,680,819 | Booth | June 8, 1954 |
| 2,683,819 | Rey | July 13, 1954 |

OTHER REFERENCES

A High Speed Shift Register Using Magnetic Binaries, by Fishman; presented at the Winter General Meeting of IRE, March 5, 1952, Fig. 10 relied upon.